Sept. 1, 1931.     J. WILLIAMS     1,821,251

PISTON RING

Filed April 4, 1930

Inventor
John Williams.
By Lacey & Lacey,
Attorneys

Patented Sept. 1, 1931

1,821,251

UNITED STATES PATENT OFFICE

JOHN WILLIAMS, OF PHILADELPHIA, PENNSYLVANIA

PISTON RING

Application filed April 4, 1930. Serial No. 441,653.

This invention relates to piston rings of the general type described in my co-pending application filed March 10, 1930, Serial No. 434,716.

An object of the present invention is to provide a piston ring having spring tongues integral therewith, said tongues preferably being formed by cutting slots obliquely in the body of the ring whereby the formation of the tongues will be accomplished without distorting the ring during any stage of manufacture.

A further object of the invention is to provide a piston ring having spring tongues fabricated from the body of the ring and adapted to exert a uniform downward pressure on the ring when the same is seated in the piston groove and coact with a novel tapered seat on the ring to centralize and steady the piston in the cylinder, said tongues terminating in contact surfaces which are disposed in close proximity to each other so that said pressure will be uniformly exerted at a great number of points around the top face of the ring.

A further object of the invention is to provide a piston ring having spring tongues integral with the body of the ring and providing oblique oil spaces below the tongues, the oil spaces overlying each other whereby more thorough lubrication of the cylinder walls is accomplished than hitherto possible.

A still further object is to provide a piston ring having the outer circumferential face beveled from a point near the lower edge of the ring to the upper edges of the tongues whereby a substantially flat annular seat will be disposed at the bottom edge of the ring for wiping contact with the wall of the cylinder to prevent oil passing the ring.

A still further object is to provide a ring having spring tongues fabricated from the body of the ring whereby a strong durable unitary structure is produced which will permit of a lighter piston being used than hitherto and also permit of the piston being machined less accurately.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 1:
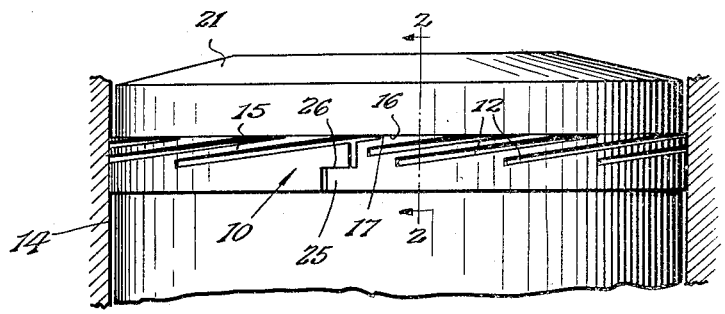
Figure 2:
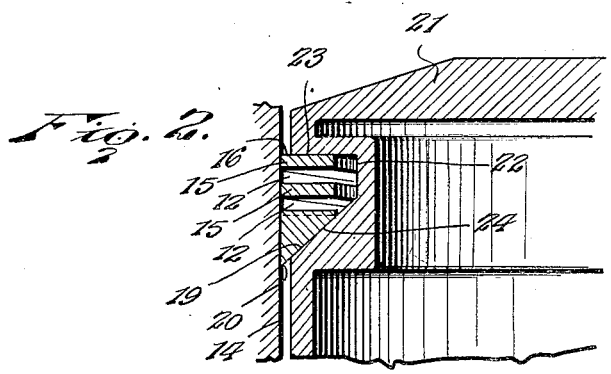
Figure 3:
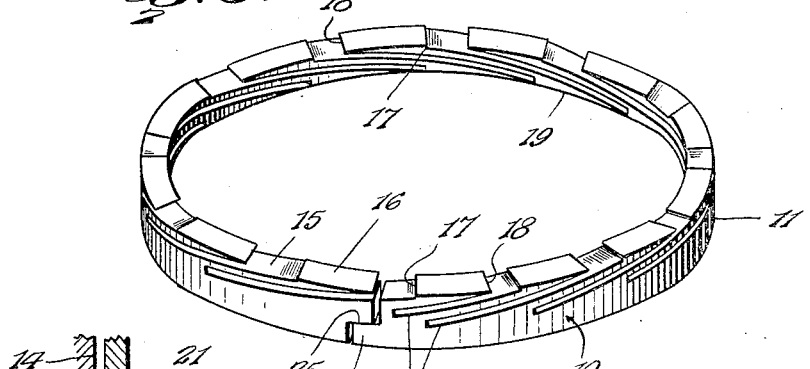
Figure 4:
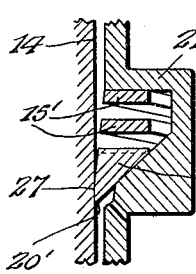

In the accompanying drawings forming part of this specification,

Figure 1 is a side elevation of a portion of a piston having thereon a piston ring constructed in accordance with my invention, Figure 2 is a fragmentary sectional view taken on the line 2—2 of Figure 1, Figure 3 is a perspective view of my improved ring, and Figure 4 is a fragmentary sectional view of an oil ring constructed in accordance with my invention.

Referring now to the drawings in which like characters of reference designate similar parts the piston ring is designated in general by the numeral 10. The ring, preferably formed of cast iron, includes a body portion 11, there being a series of oblique slots 12 formed in the upper face of the body portion. These slots are preferably cut by a suitable tool and it will be particularly pointed out that the slots are arranged at a slight angle to the upper face of the ring and are arranged parallel and overlapping as best shown in Figure 3. As a result oblique oil grooves 12 are produced circumferentially around the body of the ring whereby more thorough lubrication of the cylinder walls 14 will be effected than hitherto possible.

By cutting the oblique slots 12 in the ring as above described, a plurality of spring tongues 15 are formed, each tongue overlying the next adjacent tongue for substantially one-half the length of said adjacent tongue. The spring tongues are best shown in Figures 2 and 3.

By cutting the slots close together a great number of tongues are produced, in the present embodiment the tongues being thirteen in number, although any desired number of tongues may be formed. These tongues present their contact faces 16 against the upper wall of the piston groove as will presently be more fully explained. The large number of tongues thus produced causes said piston groove wall to exert downward pressure on the ring uniformly at a great number of points around the ring whereby the ring will be firmly seated at all times and serve to centralize and steady the piston in the cylinder whereby to positively prevent piston slapping and oil pumping.

Attention will be particularly called to the fact that during the method of manufacture as above described, namely, cutting oblique slots in the body of the ring, an integral, unitary, one-piece ring is produced having spring tongues 15 which can yield into the slots 12 when the ring is applied to the piston groove. It will be noted that no distortion of the tongues by heating, insertion of wedges, or other devices to distort the initial positions of the tongues is employed. As a result the true dimensions of the parts are maintained accurately during the manufacture of the ring and the objectionable warping and weakening of the ring with subsequent machining to true the same up, is entirely eliminated.

Preferably, the cutting tool is positioned to cut the slots 12 in such a manner that while one edge of the cutter will pass obliquely out of the top face of the ring the opposite edge of the cutter will not pass out of the top face of the ring, so that a shoulder 17 is formed on each tongue while the tongue terminates in a feather edge 18. As a result of this construction the top face or contact face 16 of each tongue is substantially oblong in contour and lies in a plane normal or substantially perpendicular to the central axis of the ring.

The purpose of this construction is to provide flat contact faces of considerable area distributed in an annular series around the ring so that when the ring is applied to the piston groove a substantially uniform downward pressure will be exerted by the top wall of the groove upon the ring to hold the ring firmly seated against the cylinder wall. At the same time the substantially flat contact faces of the tongues present nonscoring contact surfaces to said top wall of the piston groove.

By referring now to Figure 2 it will be observed that the lower edge of the body of the ring is beveled as shown at 19, the bevel extending at the upper end substantially to the lower ends of the slots 12 as also shown in Figure 3. At the lower end the beveled face 19 of the piston ring meets the circumferential wall of the ring in a feather edge 20.

By referring again to Figure 2 it will be seen that the piston 21 is provided with a ring groove 22 having a horizontal top wall 23 and a beveled bottom wall 24. When the piston ring is applied in the groove 22 the top wall 15 engages the flat contact faces 16 of the spring tongues and causes compression of the tongues. This pressure is transmitted through the tongues to the body of the ring and firmly seats the tapered seat 19 of the ring upon the corresponding tapered seat 24 of the piston groove in the piston. Obviously, a component of this downward pressure will be exerted radially on the body 11 of the ring and operate to expand the ring radially and positively seal the combustion chamber without excessive wall pressure.

In the present embodiment of my invention the ring is split as usual in piston ring construction and the split is illustrated as a step split including a tenon 25 and a recess 26 which receives the tenon.

While the compression rings are constructed substantially as above described it is preferable to taper the outer face of the oil ring 11' as best shown in Figure 4. The taper will begin at the upper edges of the tongues 15' and extend downwardly to nearly the feather edge 20' of the ring whereby a substantially annular seat 27 will be disposed at the bottom of the outer face of the ring for wiping contact with the wall of the cylinder. It is well known that no matter how accurately a ring is constructed if it starts to seat from the top oil will pass through the ring. The taper or bevel above described on the outer axial face of the ring causes the ring to positively seat at the bottom first and prevent oil passing the ring.

It will be further observed that the outer edges of the tongues 15 of the compression rings are flush with the outer edge of the body of the ring and the purpose of this construction is to produce wiping contact with the wall of the cylinder along the entire outer edge of each tongue as well as along the circumferential edge of the body of the ring. By virtue of the tongues receiving the oil from the oblique oil grooves 12, the tongues will also have oil wiping contact to prevent excessive wear on the cylinder wall.

Having thus described the invention, I claim:

1. A piston ring provided with obliquely disposed slots extending through one face of the ring, said slots producing spring tongues connected integrally with the body of the ring and providing obliquely disposed oil spaces separating the tongues, each tongue terminating in substantially a feather edge and having a shoulder spaced from said edge, the tongue presenting a substantially rectangular flat contact face between said shoulder and said edge, said ring being formed with a beveled seat on the inner face thereof extending substantially to the bottom of the tongues.

2. A piston ring provided with obliquely disposed resilient tongues struck from the body of the ring, said tongues terminating in substantially feather edges and having shoulders spaced from said edges, said tongues being substantially flat between said edges and said shoulders to provide a plurality of non-scoring contact surfaces, said body being beveled to provide a conical seat extending from the circumferential outer wall to substantially the bottom of said tongues.

3. A piston ring comprising a body and obliquely disposed resilient tongues struck from the body and forming an integral unitary structure therewith, said tongues terminating at the free ends thereof in substantially feather edges and having shoulders disposed remote from said edges, that portion of each tongue lying between the feather edge and the shoulder thereof forming a substantially flat oblong non-scoring contact surface, there being a step split in said ring comprising a tenon and a recess, the body of said ring being beveled from the outer circumferential face thereof to substantially the bottom of said tongues.

4. A piston ring comprising a body, resilient obliquely extending compression tongues overlying each other and each tongue overlapping the adjacent tongue for substantially one-half the length of said adjacent tongue, said tongues having the top faces thereof forming a plurality of spaced contact surfaces disposed in an annular series whereby the thrust of the tongues is distributed uniformly downwardly around the body, said body having a beveled lower face forming a seat extending upwardly substantially to the tongues.

5. A piston ring comprising a body, resilient obliquely disposed overlapping compression tongues struck from the body, there being obliquely disposed circumferential oil grooves separating said tongues, each tongue terminating in a substantially flat contact top face disposed near the free end thereof, said body having a beveled seat below the tongues.

6. A piston ring provided with obliquely disposed overlapping resilient tongues struck from the body of the ring and having the outer axial faces flush with the corresponding face of the body of the ring, said tongues being separated by obliquely disposed oil grooves, said body being beveled to provide a conical seat below the tongues.

7. A piston ring provided with obliquely disposed overlapping resilient tongues struck from the body of the ring, said body being beveled on the inner face to provide a conical seat below the tongues, said body having an outer axial tapered face producing a substantially annular seat near the lower edge of said body.

In testimony whereof I affix my signature.

JOHN WILLIAMS. [L. S.]